United States Patent
Anderson (10) Patent No.: US 11,273,843 B2
(45) Date of Patent: *Mar. 15, 2022

(54) USER GESTURE DIRECTED OBJECT DETECTION AND RECOGNITION IN A VEHICLE

(71) Applicant: Intel Corporation, Santa Clara, CA (US)

(72) Inventor: Glen Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/787,674

(22) Filed: Feb. 11, 2020

(65) Prior Publication Data

US 2020/0239014 A1 Jul. 30, 2020

Related U.S. Application Data

(63) Continuation of application No. 15/936,673, filed on Mar. 27, 2018, now Pat. No. 10,597,042.

(51) Int. Cl.
*B60W 50/08* (2020.01)
*G06F 3/038* (2013.01)
(Continued)

(52) U.S. Cl.
CPC .......... *B60W 50/08* (2013.01); *G05D 1/0094* (2013.01); *G06F 3/013* (2013.01); *G06F 3/017* (2013.01); *G06K 9/00335* (2013.01); *G06K 9/00818* (2013.01); *G06K 9/00845* (2013.01); *B60W 2540/21* (2020.02); *B60W 2540/215* (2020.02)

(58) Field of Classification Search
CPC .......... B60W 50/08; G09G 5/08; H04N 7/18; H04N 1/387; G08G 1/00; H04W 4/80; G06F 3/01; G06F 3/017; G06F 3/013; G06F 3/038; G06K 9/00845
See application file for complete search history.

(56) References Cited

U.S. PATENT DOCUMENTS 5,412,487 A * 5/1995 Nishimura ............. H04N 5/232
348/346
6,243,076 B1 * 6/2001 Hatfield .................. G06F 3/013
345/156
(Continued)

OTHER PUBLICATIONS

"How do Tobii Eye Trackers work?" retrieved on Jul. 3, 2018, 6 pages, https://www.tobiipro.com/learn-and-support/learn/eye-tracking-essentials/how-do-tobii-eye-trackers-work/.
(Continued)

*Primary Examiner* — Yuri Kan
(74) *Attorney, Agent, or Firm* — Schwabe, Williamson & Wyatt, P.C.

(57) ABSTRACT

Systems, apparatuses, and methods for detecting a user gesture or eye tracking for selecting of an object, and responding to the selection, are disclosed. A gesture or eye tracker may be placed near a user, along with a camera positioned to share at least a portion of a field of view with the user. The user may look or gesture to an object within the portion of the field of view, indicating its selection. The object may be recognized, and the user presented with one or more actions to take in response to the selected object.

32 Claims, 6 Drawing Sheets

(51) Int. Cl.
*G06F 3/01* (2006.01)
*G06K 9/00* (2022.01)
*G05D 1/00* (2006.01)

(56) References Cited

U.S. PATENT DOCUMENTS

| | | | |
|---|---|---|---|
| 10,081,370 B2* | 9/2018 | Roth | B60K 37/00 |
| 10,134,286 B1* | 11/2018 | Elswick | G08G 1/205 |
| 10,597,042 B2* | 3/2020 | Anderson | G06K 9/00845 |
| 2009/0079828 A1* | 3/2009 | Lee | B60R 1/00 |
| | | | 348/148 |
| 2013/0286045 A1* | 10/2013 | Kweon | G06T 19/006 |
| | | | 345/633 |
| 2017/0123492 A1* | 5/2017 | Marggraff | G06F 3/0236 |

OTHER PUBLICATIONS

Office Action dated Aug. 1, 2019 for U.S. Appl. No. 15/936,673, 16 pages.

* cited by examiner

USER GESTURE DIRECTED OBJECT DETECTION AND RECOGNITION IN A VEHICLE

RELATED APPLICATIONS

This application is a continuation of U.S. application Ser. No. 15/936,673, filed Mar. 27, 2018, entitled "USER GESTURE DIRECTED OBJECT DETECTION AND RECOGNITION IN A VEHICLE", the contents of which is hereby incorporated by reference herein in its entirety for all purposes.

TECHNICAL FIELD

Embodiments described herein generally relate to detection of user gestures indicating objects, and object recognition in the context of a vehicle. In particular, apparatuses and systems for detecting and recognizing objects indicated by user actions such as a user looking or gesturing towards the objects are described.

BACKGROUND

Modern vehicles are often equipped with entertainment and/or navigation systems, often called "infotainment" systems. In addition to providing navigation information from a local database, infotainment systems are increasingly Internet-connected, and so can supplement locally available information with information obtained from on-line sources such as Google. This information, when combined with navigation and position information, can provide immediately relevant and often up-to-date information to a user about nearby points of interest, such as restaurants, shopping, attractions, and other points of interest.

Some infotainment systems facilitate a user taking action on surrounding points of interest. Actions may include selecting a point of interest in the infotainment system, commencing navigation to the point, getting information about the point, calling ahead to schedule reservations (such when the point of interest is a restaurant), checking availability/open hours, etc. Infotainment systems may also provide information about traffic and offer options to find alternate routes around traffic, show estimated arrival times for given routes, and allow a user to call ahead to a destination, among other possible features and options.

DESCRIPTION OF EMBODIMENTS

As infotainment systems become ubiquitous in modern vehicles, a complaint levied about many infotainment systems is the degree of complexity of interaction. Users typically navigate and control modern infotainment systems by way of a relatively large screen. Input is supplied by buttons, sliders and other software generated widgets on the screen with a touch input, by physical buttons, knobs, and similar controls, or a combination of both. However, depending upon the sophistication of the infotainment system and desired information, multiple interactions may be required of a user to obtain a desired result. For example, if a user is driving through an area with a high density of possible points of interest, e.g. a shopping mall, national park, city district, etc., the infotainment system may present numerous points of interest for which to retrieve information. Selecting between a number of options may prove cumbersome depending upon the interface of the infotainment system in use. Some systems lock out interaction while the vehicle is in motion for safety reasons, diminishing the value of the infotainment system for immediate information.

Allowing a user to select a point of interest using a gesture or eye movement, viz. simply looking at an approaching point of interest, may provide a solution that avoids a potentially complex navigation of the infotainment system as well as enhances safety by not requiring a user to take his or her eyes off the road. Moreover, the range of useful information can be expanded to include objects other than points of interest, such as traffic, directional signs, information signs, and other roadside-visible points. The system may enable a user to simply look or gesture at an object and in response offer options relevant to the object. For example, if the user looks or gestures at a restaurant on the roadside, the system may automatically select the object, and offer information about the restaurant, such as hours of operation and/or food offerings. The system may further offer the user the option to contact the restaurant for reservations or to place an order. Options may be presented to the user either conventionally via the infotainment system interface, or in some embodiments, may offer voice or gesture response options. Other examples may include looking at a roadside sign for a destination and in response offering to navigate to the destination, or gesturing to a traffic jam ahead and receiving an option to reroute. Other advantages may be realized, as discussed below in greater detail.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
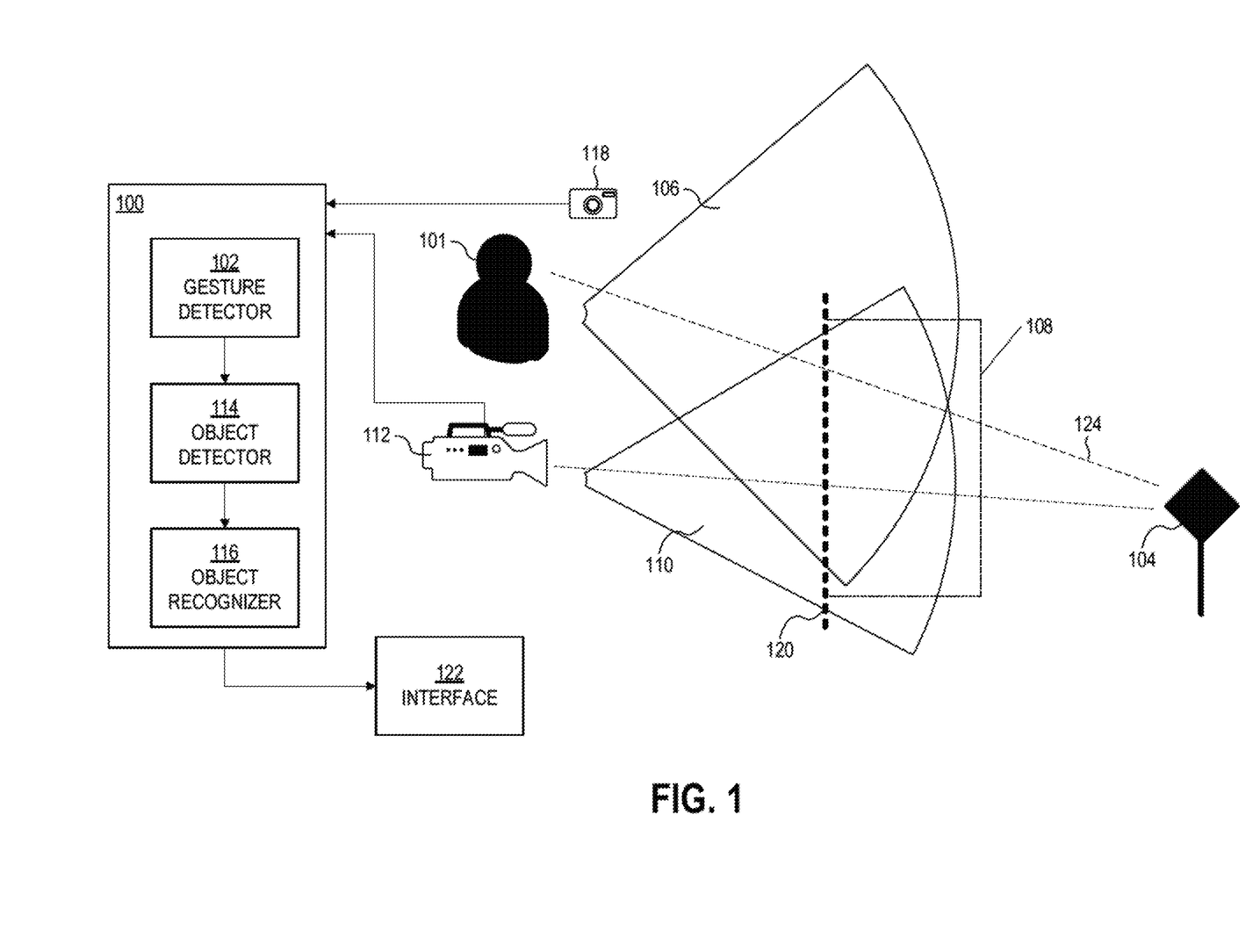
FIG. 1 is an overhead diagram of the components of a system for user gesture directed object detection and recognition, according to an example embodiment.

FIG. 1 depicts an example apparatus 100 that may include a gesture detector 102 to detect an action or posture from a user 101. The user action or posture may indicate selection by the user of an object 104 within a field of view 106 of the user. In embodiments, a portion 108 of the user's field of view 106, including the object 104, may overlap with a field of view 110 of a camera 112. An object detector 114 may detect the selected object 104 within the overlapping field of view portion 108 from a feed from the camera 112. An object recognizer 116 may perform object recognition on selected object 104 from the feed and present the user with at least one action to take based upon the detected object 104. Apparatus 100 may be part of or associated with a vehicle. Fields of view 106 and 110 may be at least partially through a windshield 120 of a vehicle.

Object 104 may be any point of interest within a user 101's field of view 106, particularly in the portion 108 that overlaps with field of view 110 of camera 112. Examples of points of interest may include shops, restaurants, parks, road signs (including traffic signs and/or informational signs), landmarks, other vehicles, lane markings, or any other object or display.

Although not depicted in the figures, apparatus 100 may be installed in a vehicle such as a car, bicycle, plane, boat, or similar contrivance. The vehicle may offer computer assisted or autonomous driving options, such as assist systems including automatic emergency braking, adaptive cruise control, lane keeping assistance, and/or any other automated vehicle control that is less than 100% automatic. Autonomous driving vehicles may offer 100% automatic navigation and control of the vehicle (e.g. self-driving vehicle). Autonomous driving vehicles may further offer less than 100% control, in a computer assisted mode.

Gesture detector 102 may receive an input from one or more devices 118. Device 118 may monitor user 101 for actions such as gestures or changes in posture. A gesture could be any physical movement by a user that can be identified as signaling a selection of an object. Some examples could include pointing, nodding, swiping, circling, or other similar movements. A change in posture may include changes such as nodding or head turning, and more commonly will include eye movements as user 101 looks at surrounding objects, such as upcoming objects through windshield 120 where apparatus 100 is implemented in a vehicle. The user 101's gestures may comprise motions, actions, or posture changes to indicate selection or attention given to an object within user 101's field of view 106.

For gesture detection, device 118 may comprise a camera that is oriented towards user 101 so that it can observe the user 101's movements and gestures. For posture change detection that includes the user 101's eye movements, device 118 may be an eye tracker, such as is known in the art. In some embodiments, device 118 may combine the functionality of a camera and an eye tracker. Device 118 may be implemented with any suitable technology now know or later developed that allows device 118 to correctly detect user 101's movements, gestures, posture changes and/or eye movements. Such examples may include a digital camera, an infrared detector, a multi-point infrared detector, or similar such technologies. In some embodiments, device 118 may provide 3-D spatial data about the position of user 101.

It can be seen in FIG. 1 that user 101 may be separate from camera 112, that may view outside through windshield 120. Where user 101 is separate from camera 112, a person skilled in the art will recognize that a parallax error may result. The angle at which user 101 views an object 104 through windshield 120 (sightline 124) may differ from the angle between camera 112 and object 104. This can be seen in FIG. 1 as the different sightlines running between user 101, camera 112, and object 104. Depending upon the range to an object 104, gesture detector 102 may need to account for the difference in position between user 101 and camera 112. In some embodiments, the position of device 118 and camera 112 may be known and fixed, allowing the geometry between device 118 and camera 112 to be pre-established. The position of user 101, however, may vary. As the geometric relationship between device 118 and camera 112 may be known, device 118 and/or gesture detector 102 may be able to determine the position of user 101 relative to device 118, which in turn can be used to determine the position of user 101 relative to camera 112. With the position of user 101 relative to camera 112 being known, a direction in which user 101 is gesturing or looking may be obtained and correlated with the field of view 110 of camera 112.

Gesture detector 102 may be configured only to detect specific gestures, or in the case of eye tracking, may be configured only to respond to a gaze that focuses on an object for a minimum threshold of time. For example, gesture detector 102 may only recognize an object selection when a user looks at an object 104 for a minimum of five (or some other suitable amount) seconds. This threshold can prevent apparatus 100 from generating spurious recognitions as a user scans his or her environment in the normal course of driving.

Gesture detector 102 may pass information about detected gestures to object detector 114. This information may include spatial information about the relative location and orientation of user 101 to camera 112, as well as a vector indicating the sightline 124 of user 101, which may be transformed through the field of view 110 of camera 112 to determine whether the user 101 is focusing on an object 104 within camera 112's field of view. Sightline 124 may include both elevation and azimuth data, namely, lateral and vertical angles for sightline 124. In some embodiments, object detector 114 may handle correlating sightline 124 with the position of any object 104 within field of view 110, such as where object detector 114 receives a video feed or images from camera 112. In other embodiments, gesture detector 102 may handle correlation, where it has at least some data about the position of object 104 within field of view 110. Still other embodiments may have correlation handled by another component of apparatus 100.

In embodiments, object detector 114 may receive an input from camera 112. Camera 112 may be a conventional digital camera, or may be purpose-built to provide an optimal feed to object detector 114. As noted above, camera 112 has a field of view 110. Camera 112 may be located inside a vehicle. In such embodiments, field of view 110 may encompass the view out of windshield 120. In other embodiments, field of view 110 may encompass not only the view out of windshield 120, but also out of one or more side windows (not shown). In still other embodiments, camera 112 may be mounted to a vehicle exterior, such as a vehicle hood, roof, or side. In such embodiments, camera 112 may not view through a windshield 120. However, camera 112 may have a field of view 110 that is calibrated to approximate at least the field of view out of windshield 120. In further embodiments, camera 112 may have a field of view 110 that approximately corresponds to the field of view 106 of user 101. Such a correspondence may allow apparatus 100 to respond to user 101 gesturing or viewing any object 104 within user's field of view 106.

Based upon the position of user 101 as may be supplied by gesture detector 102 or device 118, object detector 114 may correlate user 101's sightline 124 with an object 104. It should be appreciated that sightline 124 may be established by a user's gaze, such as where device 118 is an eye tracker, a user's gesture, such as pointing, where device 118 includes a user-facing camera, or a combination of both.

With information about the gesture or view of user 101, object detector 114 may scan the field of view 110 of camera 112 for objects in the vicinity indicated by user 101's gesture or view. In some embodiments, object detector 114 may use algorithms, such as shape detection, to process images from camera 112. In other embodiments, object detector 114 may use positional data, such as may be obtained from a GPS receiver, to determine a point or points of interest within the path defined by extending sightline 124 from the location of the vehicle. Such a positional approach may, in embodiments, be used to supplement or replace a visual object detection.

Object detector 114 may supply information about the detected object, such as shapes or visual information, to an object recognizer 116. Object recognizer 116 may in turn process the information and use it to retrieve information about the detected object 104. Processing may include known visual recognition techniques such as optical character recognition (OCR) and/or detection of shapes such as logos or directional signs, which may yield information usable to retrieve information from a data source such as an internal database, or via a web search service such as Google or Bing. In some embodiments, object detector 114 may be integrated with object recognizer 116 in a single unit or module.

Object recognizer 116 may, based upon the nature of the recognized object 104, provide relevant options to user 101 via an interface 122. Interface 122 may include a display connected to an infotainment system, and/or a voice module for providing aural alerts and options. Still other embodiments may include a heads-up display that may present information within user 101's field of view 106, so that user 101 need not be distracted from watching the highway. Interface 122 may receive inputs by any suitable means, such as gestures, voice commands, or control manipulation. In still other embodiments, interface 122 may also interface with a device 118 that is an eye tracker, so that a user 101 may be able to glance at a given option for selecting, such as when options are displayed on an infotainment system display or via a heads-up display.

Apparatus 100 may further be context-aware. For example, apparatus 100 may remember certain frequently taken routes at particular times of day, such as when user 101 travels to or from work. Apparatus 100 may be configured to offer options particularly relevant to the context. Where user 101 is traveling to work and spots a traffic jam, apparatus 100 may sense the user 101 gazing at oncoming traffic, and automatically offer to reroute to work. In another example, apparatus 100 may be aware of time of day and, upon detecting a user 101 gesturing towards an oncoming restaurant in the morning, pull up a list of that restaurant's breakfast options. Other context-aware operations may depend upon remembering the user's previous actions associated with a given landmark, and offering those as a first or preferred choice.

At least some portions of apparatus 100 may be implemented using hardware. Such hardware devices may include application-specific integrated circuits (ASICs), field-programmable gate arrays (FPGAs), discrete components, programmable controllers, general purpose programmable CPUs, or any other hardware technology now known or later developed that is capable of providing the necessary logic. Still other embodiments may employ a combination of hardware and software, such as may be stored in a computer-readable medium, to achieve the functionality of gesture detector 102, object detector 114, and object recognizer 116, with portions of either variously being implemented in hardware or software. In yet other embodiments, some portions of apparatus 100 may be implemented with online or cloud services. In such embodiments, user 101 information such as a selected object 104, or possibly images from device 118 and/or camera 112 may be provided via a network link to a cloud service for processing, with the cloud service handling some or all functions of gesture detector 102, object detector 114, and/or object recognizer 116.

Figure 2:
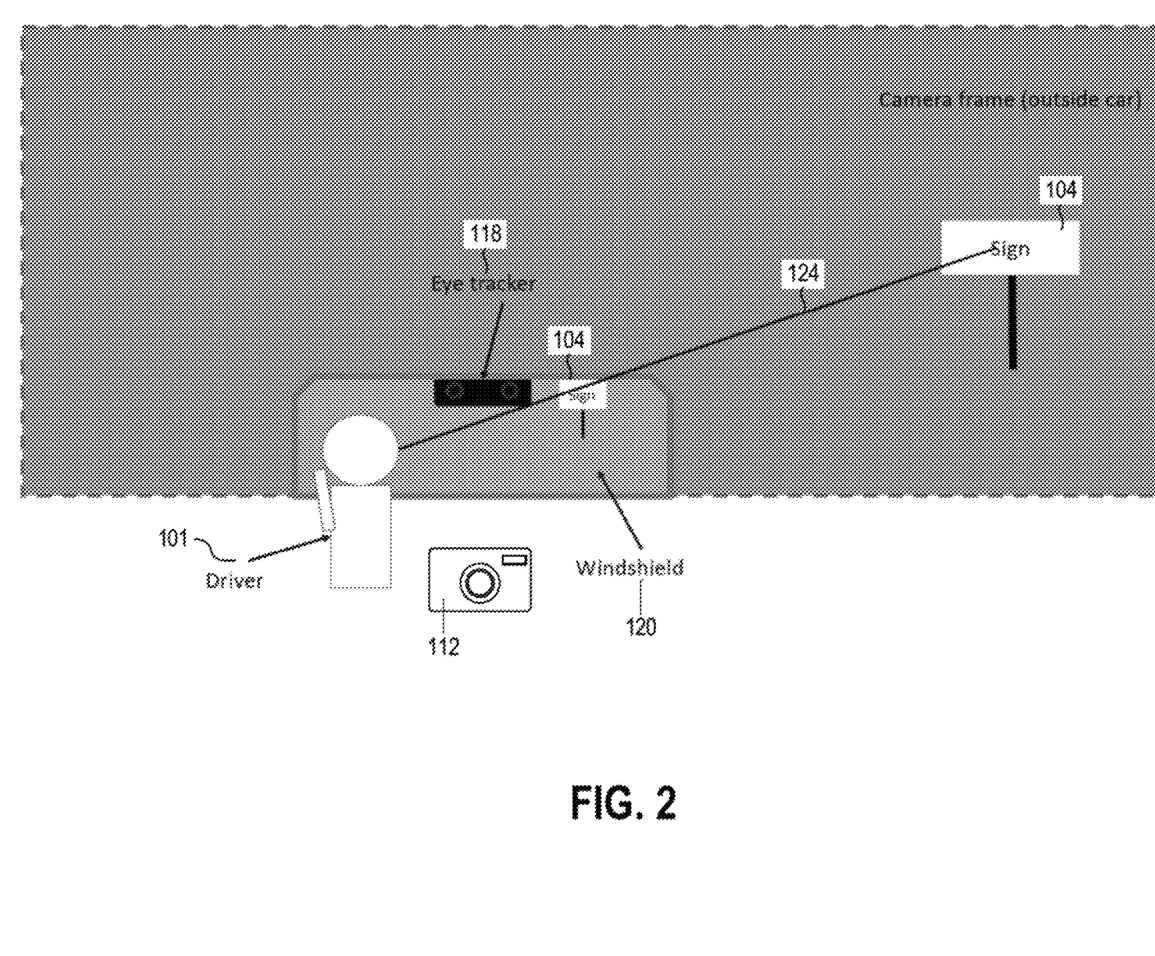
FIG. 2 is a front elevation diagram of the system of FIG. 1, according to an example embodiment.

FIG. 2 depicts a view of an embodiment of apparatus 100 from the perspective of user 101. In the embodiment, user 101 is positioned in front of windshield 120, as would be the case where user 101 is located within a vehicle. Device 118, an eye tracker in this embodiment, may be positioned near the top of windshield 120, or may be above windshield 120, such as near or disposed upon a headliner or roof of the vehicle. Alternative embodiments may place device 118 on the dash panel, just below windshield 120, or possible to one side or the other, off-center. Some embodiments of device 118 may have a plurality of sensors disposed at various points within the vehicle, and may have multiple types of device 118 to detect eye movements as well as gestures, as discussed above with reference to FIG. 1.

Through windshield 120 is located an object 104, here a road sign. Camera 112 may be located adjacent to user 101, and, in the embodiment in FIG. 2, is positioned so that its field of view at least coincides with the view outside of windshield 120. Thus, object 102 is visible to camera 112 as well as user 101 in the embodiment of FIG. 2. Sightline 124 may be seen extending through windshield 120 to the actual object 104, which would be outside of the vehicle, on the side of windshield 120 opposite both user 101 and camera 112. As described above with reference to FIG. 1, apparatus 100 may determine that user 101 has paid sufficient attention or gestured to object 104, which may be detected and recognized from the feed from camera 112.

Figure 3:
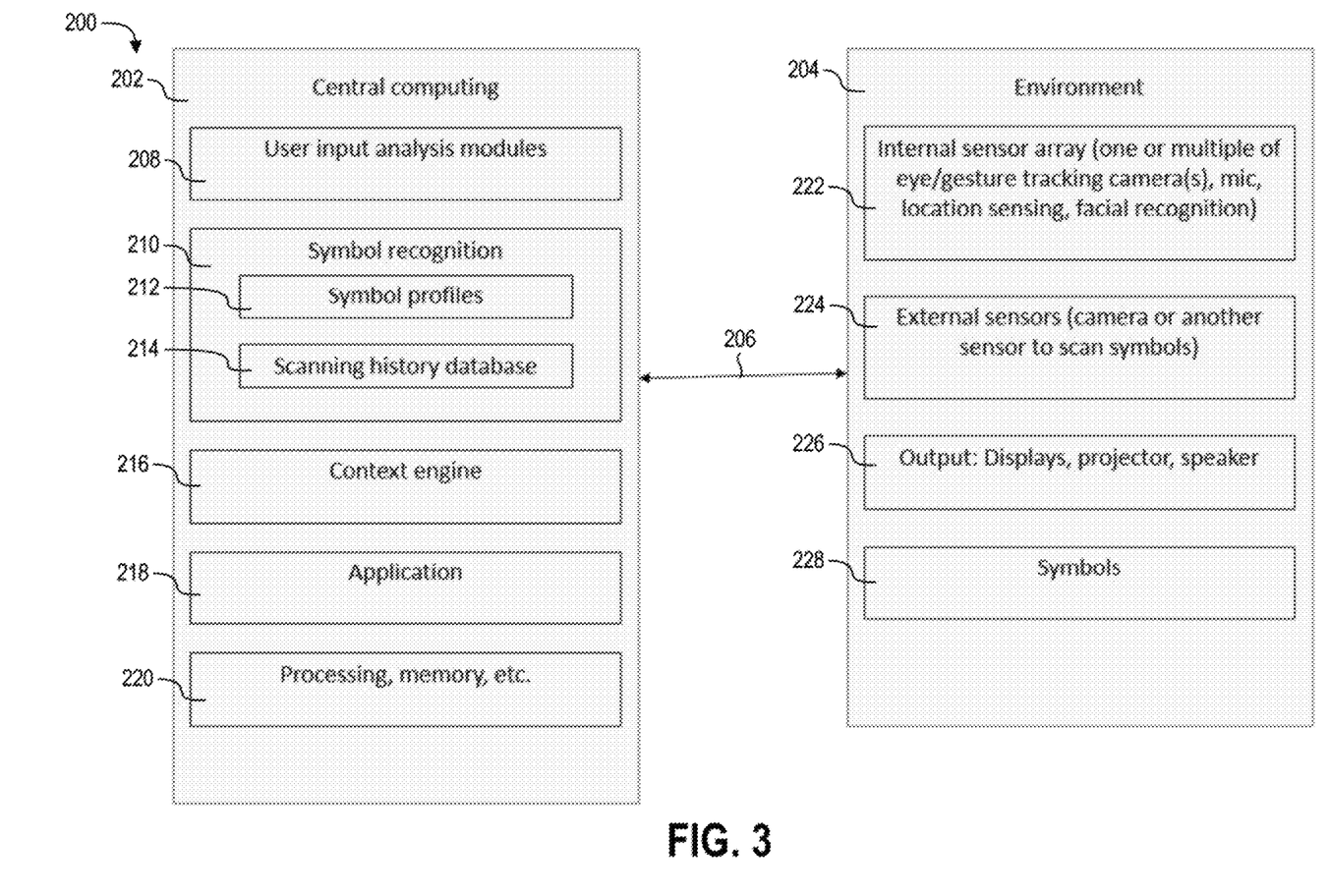
FIG. 3 is a block diagram of various components that are part of a system for user gesture directed object detection and recognition, according to a second example embodiment.

FIG. 3 depicts a block diagram of various components that may comprise an alternative embodiment of apparatus 100, here, system 200. System 200 may be considered in two groups: a central computing group 202, and an environment group 204. Central computing group 202 and environment group 204 may communicate by one or more data links 206. Such data links 206 may be wired or wireless, and may use any data transmission protocol or standard suitable to allow system 200 to function properly. Examples of such links are described below with reference to FIG. 5.

Central computing group 202 may include user input analysis modules 208, which may provide some or all functionality (or similar functionality) to gesture detector 102, as described above with reference to FIG. 1. Symbol recognition 210 may include a database of symbol profiles 212 as well as a scanning history database 214. Symbol recognition 210 may correspond to object detector 114 and/or object recognizer 116, in terms of functionality, and may additionally depict storage for tracking user 101's history of gestures, postures, and/or responses, in the form of scanning history database 214. A symbol may be any shape, text, or object that can be recognized by apparatus 100/system 200. In some embodiments, a symbol may be synonymous with an object, viz. a single object may have or be a single symbol. In other embodiments, an object may have one or more symbols, e.g. a mall or information sign may include the names and/or logos of multiple shops, or a given building or point of interest may have multiple signs and/or logos. Similarly, symbol profiles 212 may facilitate object detection and recognition by allowing symbol recognition 210 to quickly match an object 104 with its known properties. For example, symbol profiles 212 may include a list of common road signs, such as directional and information signs, and associate such road signs with appropriate actions, e.g. requesting direction to a point of interest.

Central computing group 202 may also include a context engine 216. As discussed above with respect to apparatus 100, system 200 may track context information and/or data, such as user actions, time of day, weather conditions, vehicle/user 101 location, and other relevant data points. This data may enable allow system 200 to offer appropriate actions for a given symbol or object (e.g. offering a breakfast menu for a restaurant if in the morning, or other appropriate menu based upon time of day; noting when a point of interest is upcoming or may not be open, etc.). Such information may form the context for a given symbol. One or more applications 218 may comprise part of central computing group 202, and may be designed to offer enhanced or additional functionality for selected objects 104. Applications 218 may also comprise user applications, such as streaming, entertainment, or informational services, which may further interface with other components of system 200 to enable functionality relevant to selected objects 104. For example, an object 104 may be a point of interest that has been subject to recent media coverage; system 200 may accordingly invoke a news application 218 to pull up the media coverage.

Finally, central computing group 202 may include various processing components 220, which may comprise the technical environment upon which the foregoing modules may be executed. Such components are described below with reference to FIGS. 5 and 6.

Environment group 204 may include various components that provide data to, and interaction with, central computing group 202. Environment group 204 may include an internal sensor array 222 and external sensors 224, which may correspond to device 118 and camera 112, respectively, and other such devices that allow system 200 to recognize user 101 gestures or postures and respond accordingly. Internal sensor array 222 may also include a microphone for issuing and responding to voice commands and prompts. Output devices 226 may correspond to interface 122, and may be part of an infotainment system in a vehicle. Output devices may include displays (such as the primary display of an infotainment system), projectors, speakers, and other similar devices. Symbols 228 may further supply information for output devices 226 that correlates with the selected objects 104.

Figure 4:
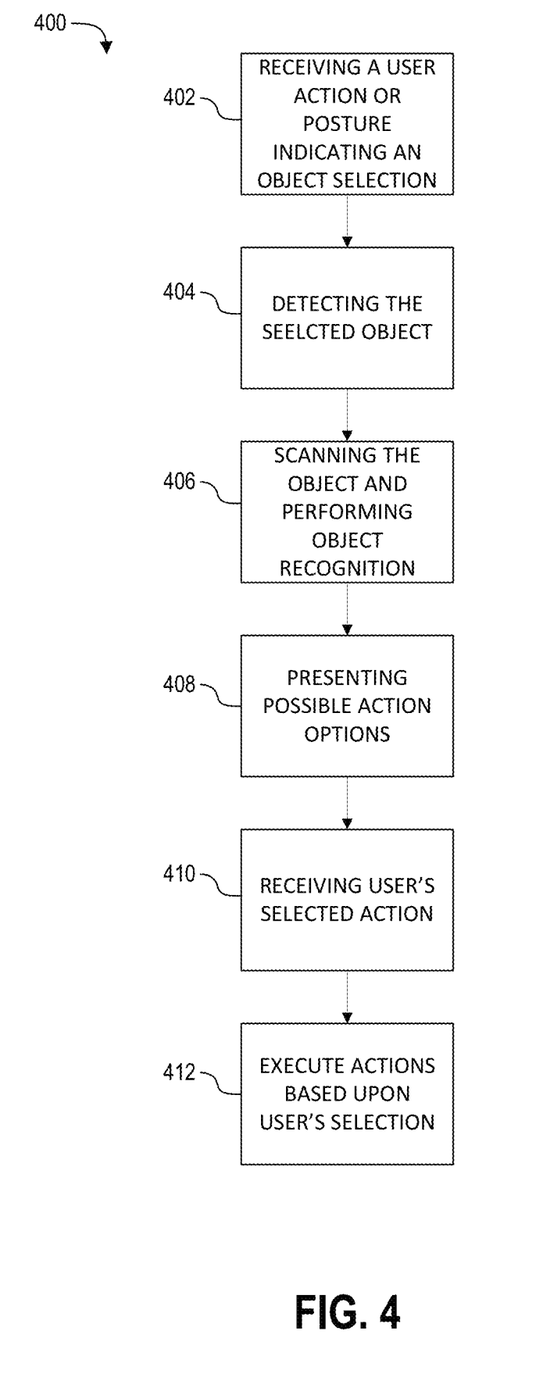
FIG. 4 is a flowchart of the steps of a method that may be executed by a system of FIG. 1 or FIG. 3, according to some embodiments.

Turning to FIG. 4, the flow a method 400 that may be executed by apparatus 100, system 200, computer device 500, or another processor or device on a vehicle or computer-assisted or autonomous driving vehicle is depicted. The operations of method 400 may be executed in whole or in part in any given embodiment, and various operations may be executed by different parts or components. In operation 402, a user action or posture may be received, indicating on object selection. In operation 404, the selected object may be detected, such as with an object detector 114. In operation 406, the object may be scanned and an object recognition routine performed with the object, such as with object recognizer 116. In operation 408, a user may be presented with possible action options to take that may be related to the recognized object. In operation 410, the user's selected action or actions may be received, and, in operation 412, the selected action or actions may be executed. The reader is referred to the foregoing discussion with FIGS. 1-3 for relevant details about how each operation may be accomplished.

Figure 5:
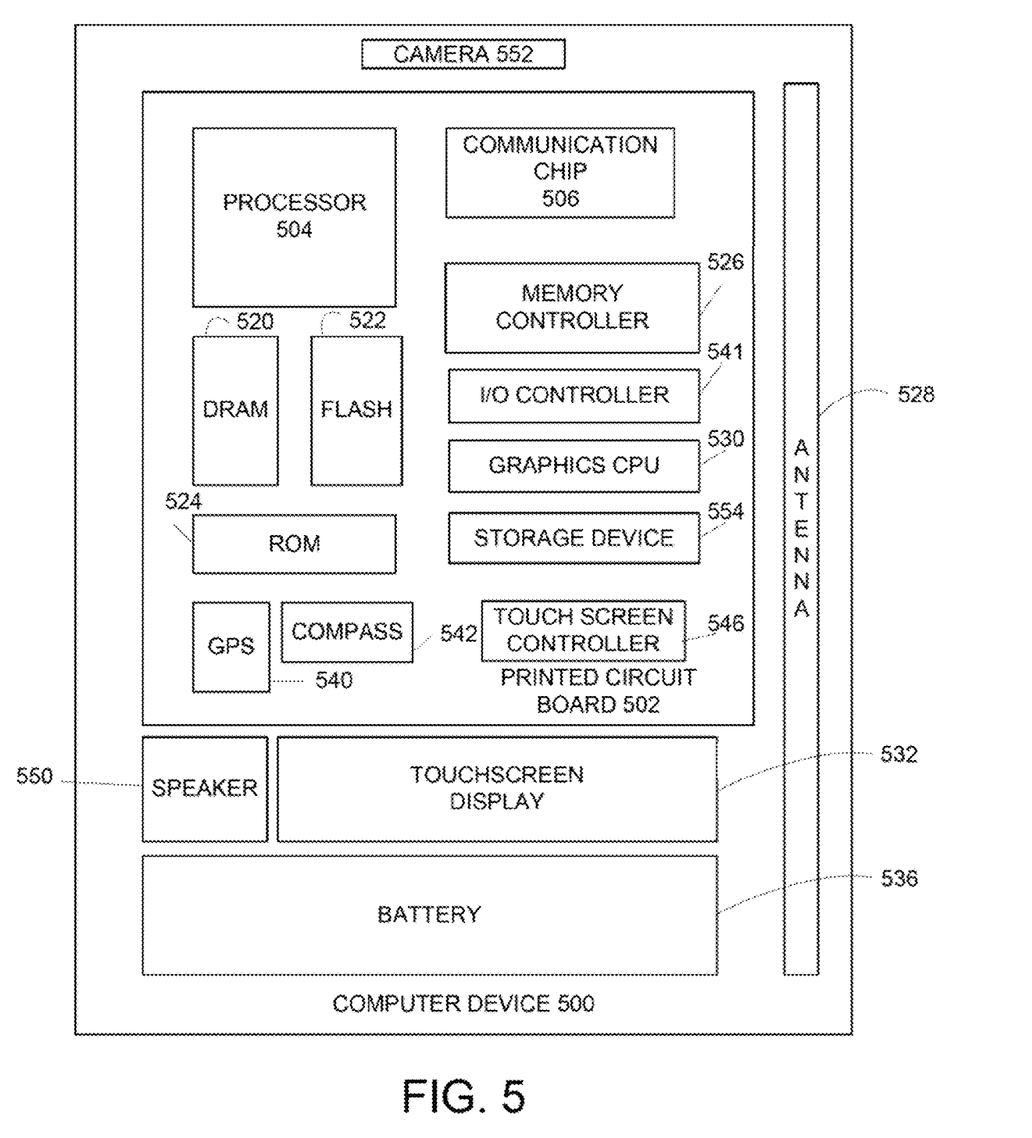
FIG. 5 is a block diagram of an example computer that can be used to implement some or all of the components of the system of FIG. 1.

FIG. 5 illustrates an example computer device 500 that may employ the apparatuses and/or methods described herein (e.g., gesture detector 102, object detector 114, and/or object recognizer 116 of apparatus 100; central computing group 202 of system 200), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown but could include at least a display of a vehicle infotainment system, as well as an output device 226 of system 200), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the sensor management methods described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 6:
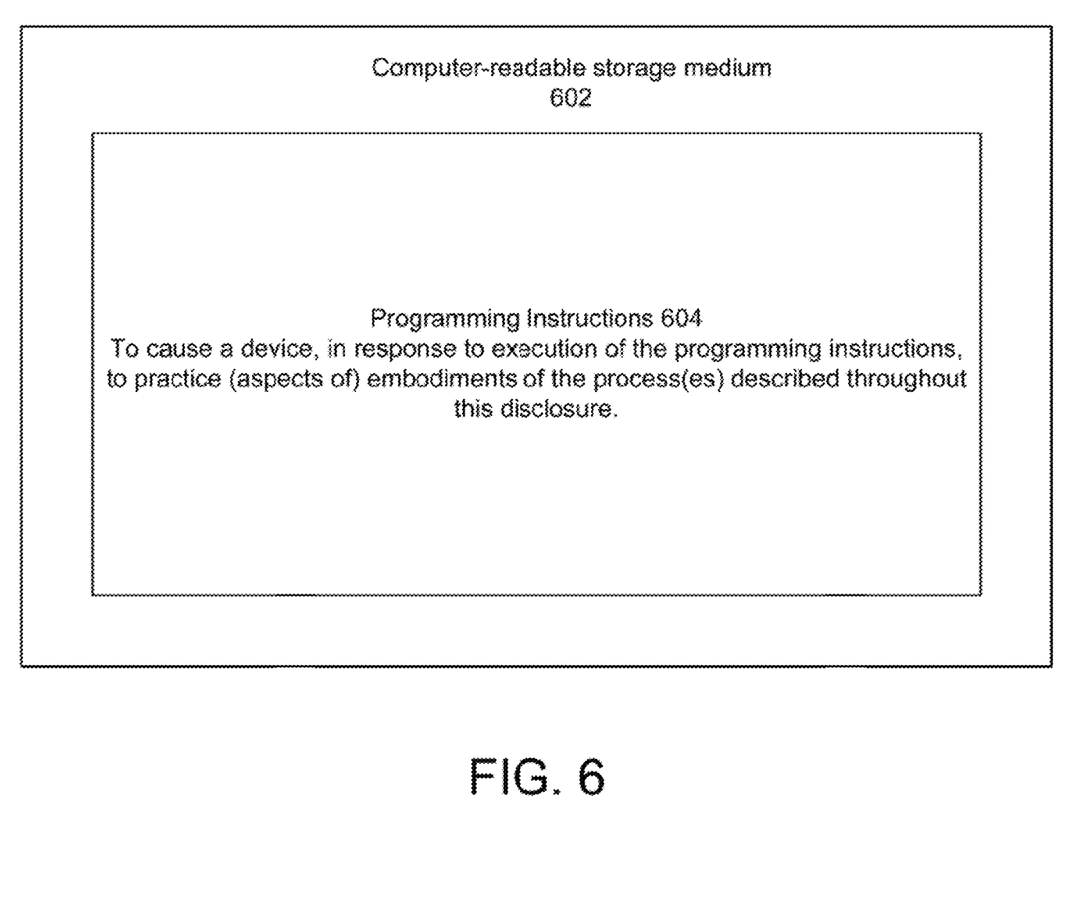
FIG. 6 is a block diagram of a computer-readable storage medium that can be used to implement some of the components of the system of FIG. 1.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) gesture detector 102, object detector 114, and/or object recognizer 116 of apparatus 100; central computing group 202 of system 200. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is an apparatus comprising a gesture detector to detect a user action or posture indicating selection by the user of an object within a field of view of the user, wherein a portion of the user's field of view including the object overlaps with a field of view of a camera, an object detector to detect the selected object within the overlapping field of view portion from a feed from the camera, and an object recognizer to perform object recognition on selected object from the feed and present the user with at least one action to take based upon the detected object.

Example 2 may include the subject matter of example 1, or any other example herein, wherein to detect a user action, the gesture detector is to detect a gesture performed by the user.

Example 3 may include the subject matter of example 1 or 2, or any other example herein, wherein the gesture detector is to detect the user action from an image from a user-facing camera.

Example 4 may include the subject matter of any of examples 1-3, or any other example herein, further comprising an eye tracker, wherein to detect a user posture, the gesture detector is to detect a position of the user's eye determined by the eye tracker.

Example 5 may include the subject matter of any of examples 1-4, or any other example herein, wherein the object recognizer is further to receive a user input indicating an action to take, the user input comprising a gesture or voice command.

Example 6 may include the subject matter of any of examples 1-5, or any other example herein, wherein the apparatus is part of a vehicle.

Example 7 may include the subject matter of example 6, or any other example herein, wherein the vehicle is a computer assisted or autonomous driving vehicle.

Example 8 may include the subject matter of example 6 or 7, or any other example herein, wherein the vehicle includes a windshield, the user's field of view is through the windshield, and the camera is positioned so that its field of view is through the windshield and at least partially overlaps the user's field of view.

Example 9 may include the subject matter of any of examples 6-8, or any other example herein, wherein the selected object is outside of the vehicle, and is visible to the user through the windshield.

Example 10 may include the subject matter of any of examples 1-9, or any other example herein, wherein at least one of the gesture detector, object detector, or object recognizer is implemented in hardware.

Example 11 is method comprising receiving a user action or posture indicating selection by the user of an object within a field of view of the user, at least a portion of the user's field of view overlapping a field of view of a camera, detecting at least one symbol on the selected object within the overlapping field of view portion from a feed from the camera, performing symbol recognition on the at least one symbol from the feed, and presenting the user with at least one action to take based upon the recognized symbol and a context for the symbol.

Example 12 may include the subject matter of example 11, or any other example herein, wherein receiving a user action comprises detecting a gesture performed by the user, the gesture detected in an image from a user-facing camera.

Example 13 may include the subject matter of example 11 or 12, or any other example herein, wherein receiving a user posture comprises detecting a position of the user's eye, determined by an eye tracker.

Example 14 may include the subject matter of any of examples 11-13, or any other example herein, further comprising receiving a user input indicating an action to take, the user input comprising a gesture or voice command.

Example 15 may include the subject matter of any of examples 11-15, or any other example herein, wherein the portion of the user's field of view overlapping the camera's field of view is through a vehicle windshield.

Example 16 may include the subject matter of any of examples 11-15, or any other example herein, wherein the method is at least partially performed by a vehicle infotainment system.

Example 17 is a non-transitory computer-readable medium (CRM) comprising instructions that cause an apparatus, in response to execution by a processor of an apparatus, to receive a user action or posture indicating selection by the user of an object within a field of view of the user, at least a portion of the user's field of view overlapping a field of view of a camera, detect the selected object within the overlapping field of view portion from a feed from the camera, perform object recognition on selected object from the feed, and present the user with at least one action to take based upon the recognized object.

Example 18 may include the subject matter of example 17, or any other example herein, wherein the instructions are further to cause the apparatus to receive a user action by detecting a gesture performed by the user from an image from a user-facing camera.

Example 19 may include the subject matter of example 17 or 18, or any other example herein, wherein the instructions are further to cause the apparatus to receive a user posture by detecting a position of the user's eye, determined by an eye tracker.

Example 20 may include the subject matter of any of examples 17-19, or any other example herein, wherein the instructions are further to cause the apparatus to receive a user input indicating an action to take, the user input comprising a gesture or voice command.

Example 21 may include the subject matter of any of examples 17-20, or any other example herein, wherein the instructions are to be executed at least in part by a vehicle infotainment system.

Example 22 is a system comprising means to detect a user action or posture indicating selection by the user of an object within a field of view of the user, wherein a portion of the user's field of view including the object overlaps a field of view of a camera, means to detect at least one symbol on the selected object within the overlapping field of view portion from a feed from the camera, and means to perform symbol recognition on the at least one symbol on the selected object from the feed and present the user with at least one action to take based upon the detected symbol.

Example 23 may include the subject matter of example 22, or any other example herein, wherein to detect a user action, the means to detect a user action or posture is to detect a gesture performed by the user from an image from a user-facing camera.

Example 24 may include the subject matter of example 22 or 23, or any other example herein, wherein the means to detect a user action or posture are further to receive a user posture by detecting a position of the user's eye, determined by an eye tracking means.

Example 25 may include the subject matter of any of examples 22-24, or any other example herein, further comprising means to receive a user input indicating an action to take, the user input comprising a gesture or voice command.

Example 26 may include the subject matter of any of examples 1-9, or any other example herein, wherein at least one of the gesture detector, object detector, or object recognizer is implemented at least partially in software.

Example 27 may include the subject matter of any of examples 11-15, or any other example herein, wherein the method is performed at least partially by a vehicle.

Example 28 may include the subject matter of example 27, or any other example herein, wherein the vehicle is a computer assisted or autonomous driving vehicle.

Example 29 may include the subject matter of example 27 or 28, or any other example herein, wherein the vehicle includes a windshield, the user's field of view is through the windshield, and the camera is positioned so that its field of view is through the windshield and at least partially overlaps the user's field of view.

Example 30 may include the subject matter of any of examples 11-15 or 27-29, or any other example herein, wherein the selected object is outside of the vehicle, and is visible to the user through the windshield.

Example 31 may include the subject matter of any of examples 17-21, or any other example herein, wherein the instructions are to be executed at least partially by a vehicle.

Example 32 may include the subject matter of example 31, or any other example herein, wherein the vehicle is a computer assisted or autonomous driving vehicle.

Example 33 may include the subject matter of example 31 or 32, or any other example herein, wherein the vehicle includes a windshield, the user's field of view is through the windshield, and the camera is positioned so that its field of view is through the windshield and at least partially overlaps the user's field of view.

Example 34 may include the subject matter of any of examples 17-21 or 31-33, or any other example herein, wherein the selected object is outside of the vehicle, and is visible to the user through the windshield.

Example 35 may include the subject matter of any of examples 22-25, or any other example herein, wherein the system is at least part of a vehicle.

Example 36 may include the subject matter of example 35, or any other example herein, wherein the vehicle is a computer assisted or autonomous driving vehicle.

Example 37 may include the subject matter of example 35 or 36, or any other example herein, wherein the vehicle includes a windshield, the user's field of view is through the windshield, and the camera is positioned so that its field of view is through the windshield and at least partially overlaps the user's field of view.

Example 38 may include the subject matter of any of examples 22-25 or 35-37, or any other example herein, wherein the selected object is outside of the vehicle, and is visible to the user through the windshield.

Example 39 may include the subject matter of any of examples 11-15, 22-25, 27-30, or 35-38, or any other example herein, wherein the at least one action to take is further based upon a context for the symbol.

Example 40 may include the subject matter of example 39, or any other example herein, wherein the context for the symbol may include time of day, weather conditions, traffic conditions, and/or previous user selections.

Example 41 may include the subject matter of any of examples 1-40, or any other example herein, wherein the user may select a presented action to take using a voice command, a gesture, or a posture, the posture including a tracked eye movement.

Example 42 may include the subject matter of any of examples 1-41, or any other example herein, wherein the object and/or symbol may be recognized by reference to a symbol database.

Example 43 may include the subject matter of any of examples 1-9, or some other example herein, wherein at least one of the gesture detector, object detector, or object recognizer is implemented at least partially on a cloud-based platform.

What is claimed is:

1. An apparatus for processing user interaction in a vehicle, comprising:
    object detection circuitry to detect a field of view observed by one or more sensors, the field of view observed by the one or more sensors including an object;
    user detection circuitry to detect a user action or posture, the user action or posture indicating selection of the object, and the selected object being within a field of view of the user that overlaps the field of view observed by the one or more sensors; and
    object recognition circuitry to:
        identify the selected object from the field of view observed by the one or more sensors;
        determine information of the selected object; and
        identify at least one action to execute, based on the determined information of the selected object.

2. The apparatus of claim 1, wherein the user action or posture is an eye movement, and wherein the object recognition circuitry is further to identify the selected object based on a direction of the eye movement.

3. The apparatus of claim 1, wherein the user action or posture is a gesture, and wherein the object recognition circuitry is further to identify the selected object based on a direction of the gesture.

4. The apparatus of claim 1, wherein the user action or posture is a voice command from the user, and wherein the object recognition circuitry is further to identify the selected object based on the voice command from the user.

5. The apparatus of claim 1, wherein the user action or posture is identified from input obtained with one or more of: a user-facing camera, a microphone, or an eye tracker.

6. The apparatus of claim 1, wherein the one or more sensors include a camera configured to capture the field of view.

7. The apparatus of claim 1, wherein the apparatus is integrated within the vehicle.

8. The apparatus of claim 7, wherein the apparatus is part of an infotainment system of the vehicle.

9. The apparatus of claim 7, wherein the vehicle is a computer assisted or autonomous driving vehicle.

10. The apparatus of claim 7, wherein the vehicle includes a windshield, the field of view of the user includes a field of view visible through the windshield, and the one or more sensors are positioned to capture the field of view through the windshield to at least partially overlap the field of view of the user.

11. The apparatus of claim 10, wherein the selected object is outside of the vehicle, and is visible to the user through the windshield.

12. A vehicle, comprising:
one or more sensors to observe a field of view; and
a user interaction system, the user interaction system comprising:
object detection circuitry to detect a field of view observed by one or more sensors, the field of view observed by the one or more sensors including an object;
user detection circuitry to detect a user action or posture, the user action or posture indicating selection of the object, and the selected object being within a field of view of the user that overlaps the field of view observed by the one or more sensors; and
object recognition circuitry to:
identify the selected object from the field of view observed by the one or more sensors;
determine information of the selected object; and
identify at least one action to execute, based on the determined information of the selected object.

13. The vehicle of claim 12, wherein the user action or posture is an eye movement, and wherein the object recognition circuitry is further to identify the selected object based on a direction of the eye movement.

14. The vehicle of claim 12, wherein the user action or posture is a gesture, and wherein the object recognition circuitry is further to identify the selected object based on a direction of the gesture.

15. The vehicle of claim 12, wherein the user action or posture is a voice command from the user, and wherein the object recognition circuitry is further to identify the selected object based on the voice command from the user.

16. The vehicle of claim 12, wherein the user action or posture is identified from input obtained with one or more of: a user-facing camera, a microphone, or an eye tracker.

17. The vehicle of claim 12, wherein the one or more sensors include a camera configured to capture the field of view.

18. The vehicle of claim 12, wherein the user interaction system is coupled to an infotainment system of the vehicle.

19. The vehicle of claim 12, wherein the vehicle is a computer assisted or autonomous driving vehicle.

20. The vehicle of claim 12, wherein the vehicle includes a windshield, the field of view of the user includes a field of view visible through the windshield, and the one or more sensors are positioned to capture the field of view through the windshield to at least partially overlap the field of view of the user.

21. The vehicle of claim 20, wherein the selected object is outside of the vehicle, and is visible to the user through the windshield.

22. At least one non-transitory machine-readable storage medium comprising instructions stored thereupon, which when executed by circuitry of a user interaction system, cause the circuitry to perform operations comprising:
obtaining data of a field of view observed by one or more sensors, the field of view observed by the one or more sensors including an object;
obtaining data of a user action or posture, the user action or posture indicating selection of the object, and the selected object being within a field of view of the user that overlaps the field of view observed by the one or more sensors;
identifying the selected object from the field of view observed by the one or more sensors;
determining information of the selected object; and
identifying at least one action to execute, based on the determined infonnation of the selected object.

23. The machine-readable storage medium of claim 22, wherein the user action or posture is an eye movement, and wherein the operations further comprise identifying the selected object based on a direction of the eye movement.

24. The machine-readable storage medium of claim 22, wherein the user action or posture is a gesture, and wherein operations further comprise identifying the selected object based on a direction of the gesture.

25. The machine-readable storage medium of claim 22, wherein the user action or posture is a voice command from the user, and wherein the operations further comprise identifying the selected object based on the voice command from the user.

26. The machine-readable storage medium of claim 22, wherein the user action or posture is identified from input obtained with one or more of: a user-facing camera, a microphone, or an eye tracker.

27. The machine-readable storage medium of claim 22, wherein the one or more sensors include a camera configured to capture the field of view.

28. The machine-readable storage medium of claim 22, wherein the user interaction system is integrated within a vehicle.

29. The machine-readable storage medium of claim 28, wherein the user interaction system is part of an infotainment system of the vehicle.

30. The machine-readable storage medium of claim 28, wherein the vehicle is a computer assisted or autonomous driving vehicle.

31. The machine-readable storage medium of claim 28, wherein the vehicle includes a windshield, the field of view of the user includes a field of view visible through the windshield, and the one or more sensors are positioned to capture the field of view through the windshield to at least partially overlap the field of view of the user.

32. The machine-readable storage medium of claim 31, wherein the selected object is outside of the vehicle, and is visible to the user through the windshield.

* * * * *

UNITED STATES PATENT AND TRADEMARK OFFICE
CERTIFICATE OF CORRECTION

| | | |
|---|---|---|
| PATENT NO. | : 11,273,843 B2 | Page 1 of 1 |
| APPLICATION NO. | : 16/787674 | |
| DATED | : March 15, 2022 | |
| INVENTOR(S) | : Glen Anderson | |

It is certified that error appears in the above-identified patent and that said Letters Patent is hereby corrected as shown below:

In the Claims

Column 16
Line 26, "...determined infonnation..." should read – "...determined information..."

Signed and Sealed this
Thirty-first Day of May, 2022

Katherine Kelly Vidal
*Director of the United States Patent and Trademark Office*